Patented June 2, 1936

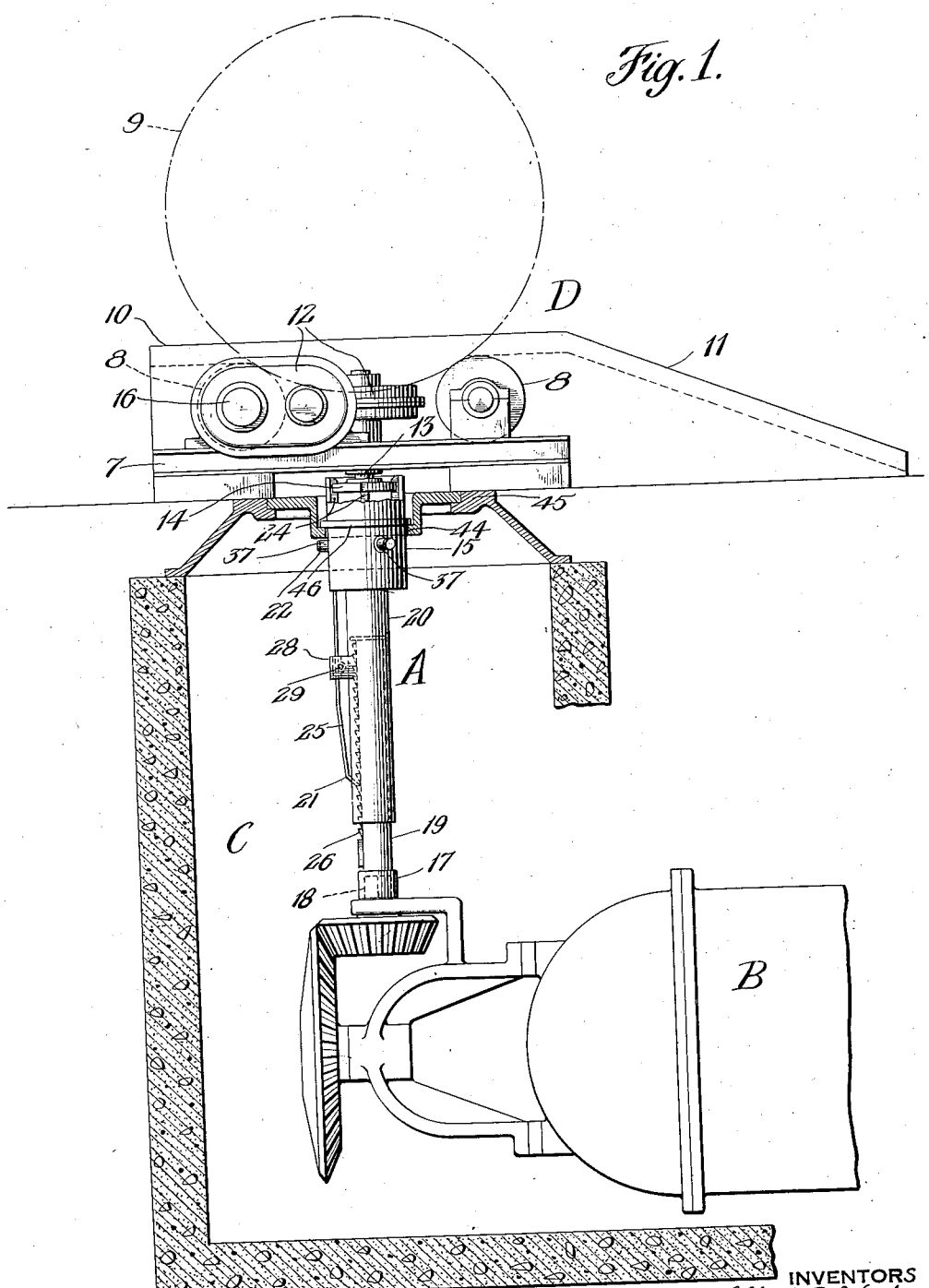

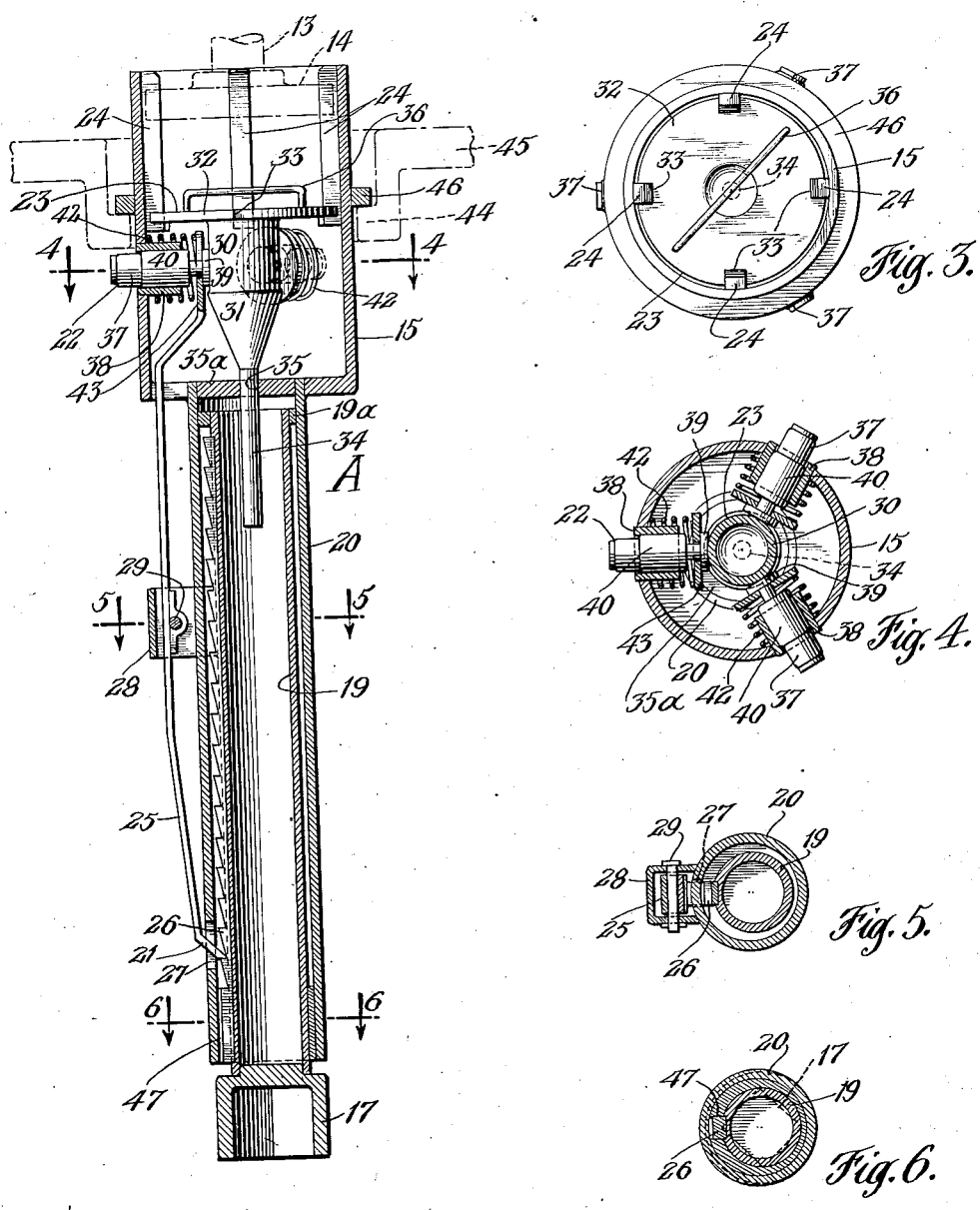

2,042,574

UNITED STATES PATENT OFFICE 2,042,574

VALVE OPERATING APPARATUS

Albert Baldwin Wood and Henry Wade Barnett, New Orleans, La.

Application July 26, 1935, Serial No. 33,323

4 Claims. (Cl. 81—53)

This invention relates to valve operating apparatus particularly useful for the operation of underground valves and similar mechanisms by a power device located thereabove.

One of the primary objects of the invention is the provision of improved operating apparatus for the above purpose which is effectively adjustable to variations in the distance between the power device and the mechanism to be operated thereby.

A further object of the invention is the provision of valve operating apparatus which is in the nature of an adjustable key or wrench adapted to be adjusted and positioned against displacement in an effective manner.

Another object of the invention is the provision of valve operating apparatus in the nature of an adjustable or extensible key or wrench which is adapted to be locked in its adjusted position and against displacement from operative position in a novel manner.

A more specific object of the invention is the provision of apparatus for operating valves located in manholes which is adapted to be locked against displacement by locking means cooperating with the cover means of the manhole.

It is also an object of the invention to provide apparatus for operating a valve or similar mechanism located in a manhole or pit from a power device thereabove which is adapted to be adjusted and held against displacement by operation of a common operating means located at the upper portion of the apparatus.

How the foregoing, together with such other objects and advantages as may hereinafter appear, or are incident to our invention are realized, is illustrated in preferred form in the accompanying drawings, wherein:

Fig. 1 is a more or less diagrammatic sectional elevational view illustrating apparatus constructed in accordance with our invention as used for operating an underground valve from an automobile operated power transmitting device, the manhole in which the valve is located being shown in cross section;

Fig. 2 is an enlarged sectional elevation of the valve operating apparatus; and

Fig. 3 is a plan view of Fig. 2.

Figs. 4, 5 and 6 are plan sections taken on the lines 4—4, 5—5, and 6—6 respectively of Fig. 2.

Referring to the drawings our valve operating apparatus which is in the nature of a key or wrench is illustrated at A as applied to an underground valve B of the large size used in water distribution systems and located in a manhole C. The valve is power operated and in Fig. 1 we have illustrated, as a preferable source of power, an automobile operated power transmitting device D of the form disclosed in our copending application Serial No. 33,322, filed July 26, 1935 which comprises in general a base structure 7 carrying rollers 8 for rotatably supporting one of a pair of automobile power wheels 9, supporting structure 10 for non-rotatably supporting the other power wheel, suitable ramp means 11, and gear reduction mechanism 12 for connecting one of the rollers 8 to a power take-off shaft 13. A clutch or coupling member 14 is secured on the shaft 13 for cooperation with a driving head 15 of the valve operating mechanism A as will fully appear hereinafter. The device D also includes a friction drive as indicated at 16 for preventing binding or breakage of the valve by the application of too great an amount of power thereto.

My improved mechanism A comprises in general the driving head 15 above referred to, a socket 17 for engaging a nut portion 18 on the valve B, a tubular member or casing 19 secured to and extending upwardly from the socket 17 and arranged to telescope within the tubular member or casing 20 which is secured to and extends downwardly from the head 15, a ratchet device 21 for adjusting purposes, locking means 22 for preventing displacement of the mechanism, and actuating means 23 for the ratchet device and the locking means.

The driving head 15 is provided with internal splines 24 engageable with the coupling member 14 on the shaft 13 of the power transmitting device D so that the head with its tubular extension 20 is rotated by the power device.

In Fig. 2 I have illustrated the casing 19 of the socket 17 telescoped into the casing 20 of the driving head so that the device or wrench is of its shortest dimension. In this position the spring pawl 25 is in engagement with a tooth of the ratchet 26 which is secured to the casing 19. An opening 27 is provided in the wall of the casing 20 through which the pawl passes for engagement with the ratchet. A bracket 28 is secured to the casing 20 for pivotally attaching the pawl to the casing as by means of a pin 29.

In order to move the pawl into and out of engagement with the teeth of the ratchet we provide the actuating means 23 comprising a member having an upper cylindrical portion 30, a lower conical portion 31, a flanged portion 32 having grooves 33 fitting the splines 24 of the head 15, and a downwardly extending guide pin 34 fitting an aperture 35 in the member 35a. A handle 36 is provided for raising and lowering the actuating means and when it is in lowermost position as shown in Fig. 2 the pawl 25 is held in its position of engagement with the ratchet teeth.

The actuating means 23 also serves as an actuator for a plurality of members such as rollers 37 which pass through bushings or sleeves 38 secured in the head 15. With the means 23 in its lower position as shown the cylindrical portion 30 engages the heads 39 of the pins 40 which carry the rollers and therefore the rollers project from the head, it being noted that the pins 40 operate in the bushings 38 and that compression springs 42 operate to maintain the pins in spring engagement with the actuating means 23. The upper end portion 43 of the pawl 25 is interposed between one of the springs 42 and the head of the associated pin so that the actuating means 23 is common to the ratchet device 21 and to the locking means 22 of which the rollers 37 are a part.

The rollers when in the projected position illustrated serve as a means to lock the device in position against displacement for it will be seen that they project underneath of the rim 44 of the manhole cover means 45 so that the device cannot move upwardly out of engagement with the valve nut or fall into the manhole. A collar 46 adapted to rest on the cover means of the manhole is provided on the head 15.

When the actuating means 23 is raised the springs 42 cause the pins 40 and rollers 37 to move inwardly because of the heads 39 being in engagement with conical portion 31. Thus the rollers are retracted and at the same time the pawl 25 is released from the ratchet teeth 26 and assuming the wrench to be in extended position the inner casing 19 can telescope in a vertical direction within the outer casing 20 to shorten the wrench. These casings however do not rotate relative to each other because a keyway 47 is provided in the outer casing 20 for the ratchet 26 which acts as a key. The upper portion of the casing 19 is guided within the casing 20 as by means of a collar 19a secured to the casing 19.

In applying our improved mechanism to valves for operation by a power device the handle 36 of the actuating means 23 is pulled up so that the mechanism or wrench is extended at full length. The socket 17 is then placed on the nut 18 of the valve and the mechanism is telescoped into shortened position until the collar 46 rests on the manhole cover means 45 as illustrated in Fig. 1. The handle 36 is then pushed down, as shown in Fig. 2, which causes the pawl 25 to engage the ratchet 26 and also pushes the rollers 37 out into projecting position to extend underneath of the rim 44 of the cover means 45. This locks the mechanism in position against displacement as above described.

Having thus positioned and locked the mechanism in place the power transmitting device D is positioned thereover with the coupling member 14 in splined engagement with the driving head 15. Then the device D is operated to actuate the valve to open or closed position as desired.

We claim:—

1. Valve operating apparatus comprising a driving head having means affording connection to a power device for drive thereby, a socket portion for engagement with the stem of a valve to be operated, spline means connecting said head and socket portion together whereby the apparatus may be adjusted to extended and retracted positions, ratchet means comprising teeth and a resilient pawl associated with the spline means for releasably locking the apparatus against movement in the direction of retraction, and a movable member with which the free end portion of said pawl has spring engagement, said movable member having a cylindrical portion effecting engagement of the pawl with the teeth and a conical portion effecting release of the pawl from the teeth.

2. In apparatus for providing operative connection between a valve located in a manhole and a power device located thereabove, the combination of a driving head having means affording connection thereof to the power device, a socket member for engaging the stem of the valve, means telescopically connecting said head and socket member for rotation together and enabling adjustment of the apparatus to the distance between power device and valve, releasable means engageable with the manhole for preventing displacement of the apparatus from operative position, and means accessible from above for releasing said last mentioned means.

3. In apparatus for providing operative connection between a valve located in a manhole and a power device located thereabove, the combination of a driving head having means affording connection thereof to the power device, a socket member for engaging the stem of the valve, means telescopically connecting said head and socket member for rotation together and enabling adjustment of the apparatus to the distance between power device and valve, members projectable from said head to engage a portion of the manhole to prevent displacement of the apparatus from operative position and retractable into said head for disengagement with said portion of the manhole, and means operable from above the manhole to effect such projection and retraction of said members.

4. An adjustable key wrench for operating valves located in manholes from a power device thereabove comprising a head for connection to the power device, a socket for connection to the valve, a telescopic portion enabling adjustment of the wrench to the desired length, means for releasably locking the wrench against movement in the direction of shortening it, means for releasably locking the wrench against displacement from operative association with the power device and valve, and means for releasing said last two mentioned means.

ALBERT BALDWIN WOOD.
HENRY WADE BARNETT.